United States Patent Office 3,362,261
Patented Jan. 9, 1968

3,362,261
AUTOMATIC CONTROL VALVE SYSTEM FOR A MULTIPLE SPEED RATIO POWER TRANSMISSION MECHANISM
Richard A. Snyder, Garden City, and Donald L. Roskopf, Grosse Ile, Mich., assignors to Ford Motor Company, Dearborn, Mich., a corporation of Delaware
Filed May 10, 1965, Ser. No. 454,261
6 Claims. (Cl. 74—864)

ABSTRACT OF THE DISCLOSURE

This specification discloses a control valve system including fluid pressure operated clutch and brake servos for an automatic power transmission mechanism in an automotive vehicle driveline. Provision is made in the valve system for augmenting the circuit pressure made available to the servos to increase the vehicle coasting torque capacity when the control system is conditioned for intermediate underdrive speed ratio operation under closed throttle conditions while the vehicle is traveling at a relatively high speed. The augmentation is increased or decreased in response to changes in the vehicle speed. The system is sensitive during coasting also to changes in the torque transmitting requirements of the driveline.

Brief description of the invention

Our invention relates generally to automatic power transmission mechanisms for automotive vehicle drivelines. It relates more particularly to an automatic control valve arrangement capable of contolling the engagement and release of fluid pressure operated friction members that in turn establish plural torque delivery paths through gear elements of the mechanism. The friction elements are actuated by fluid pressure operated servos, and the valve system of which our invention forms a part is capable of varying the capacities of the servos and their modes of operation in response to changes in operating pressure signals that sense the torque and power requirements of the driveline.

Our invention is an improvement in the control system shown in the copending applications of John J. Searles, Ser. Nos. 397,798 now Patent No. 3,327,554 and 401,356, filed Sept. 21, 1964, and Oct. 5, 1964, respectively, which are assigned to the assignee of our instant invention. Reference may be had to these disclosures for the purpose of supplementing this disclosure.

In each of the transmission control systems disclosed in the aforementioned copending applications there are included two fluid pressure brake servos and two fluid pressure operated clutch servos that are situated in communication with an engine driven pump which acts as a pressure source. Distribution of pressure from the pump to each of the servos is controlled by valve components situated in the conduit structure that extends to the servos.

The valve system includes a pressure regulator valve that is capable of establishing a pressure level in the system that is sufficient to maintain the required capacity of the servos regardless of changing operating conditions. As the engine torque increases, provision is made for causing the regulator valve to assume a higher regulated output pressure. Similarly, provision is made for reducing the magnitude of the regulated pressure level maintained by the regulator for any given engine torque as the vehicle speed increases. The reduction of line pressure under these conditions may take place without slippage of the clutch or brake members of the gear system since the hydrokinetic torque converter that is situated between the vehicle engine and the power input elements of the gear system functions at a reduced torque ratio as the speed of the vehicle increases for any given engine torque.

When the vehicle is traveling at a relatively high speed and the vehicle operator desires to decelerate the vehicle by coasting with a closed engine carburetor throttle, the direction of torque delivery through the gear system is reversed as the traction wheels tend to drive the engine, the latter acting as a brake. But since such coasting operation, of necessity, requires a closed or reduced throttle setting, and since the regulator valve normally would respond to the closing of the throttle to provide a minimum control system pressure as explained in the preceding paragraph, provision must be made for maintaining the capacity of the servos so that slippage of the clutch and brake friction elements that they control will not occur. An attempt has been made in earlier control systems to provide a temporary increase in the regulated pressure level under these coasting conditions by providing a coasting pressure boost valve that responds to an increase in the vehicle speed pressure signal and a reduction in the vehicle torque sensitive pressure signal to distribute an auxiliary pressure to the regulator valve to upset the normally balanced regulator valve forces thereby causing the regulator valve to assume a higher regulated pressure condition. Such an arrangement, however, will effect an increase in the regulated pressure level when the vehicle enters a coasting condition at high speeds regardless of the drive range that the gear system has assumed.

It is not necessary to establish a boost in control system pressure when the gear system assumes a high speed ratio condition. Indeed, an increase in the control system pressure during high speed coasting therefore results in an unnecessary load upon the engine driven pump. This causes premature pump failure and contributes to over-all inefficiency in the operation of the driveline. It is an object of our invention, therefore, to provide a valve system having a coasting pressure boost characteristic of the type generally described in the foregoing paragraphs, but which is effective to eliminate an undesired pressure boost under coasting conditions when the gear system is conditioned for high speed ratio operation.

In a transmission environment of the type with which we now are concerned, the lowest speed ratio is obtained by engaging a forward drive clutch which connects the turbine of the hydrokinetic torque converter to a power input element of the gear system. The reaction element of the gear system is anchored against rotation during low speed ratio operation by an overrunning brake. No friction brake member is required to establish this driving condition. A manual low friction brake is required, however, if the reaction element of the gear system is to be adapted for accommodating torque delivery from the traction wheels to the engine when the gear system is conditioned for continuous, low speed ratio operation. The friction brake can be made self-energizing during such reverse torque delivery, and it then is merely a matter of design to provide the brake with sufficient capacity for accommodating the maximum torque that might be experienced during high speed coasting operation in the low driving speed ratio.

We are aware of certain known automatic control valve systems that use the pressure that is utilized by the reverse servo during reverse drive operation to establish an augmentation in the regulated line pressure. This same servo is used to apply the previously mentioned manual low friction brake during continuous, low speed ratio operation. If the vehicle is coasting in an intermediate ratio with the low speed ratio servo released, however, the coasting boost pressure signal then is not available to the regulator valve. Thus, a control system pressure boost is not obtained under the very conditions when it is required most although it is obtained during coasting operation in the low speed ratio when it is required the least. If the vehicle is coasting at relatively high speeds and the transmission gear system is caused to assume an intermediate speed ratio condition, the reaction brake that is engaged to establish intermediate speed ratio operation of the gearing thus loses capacity and excessive slipping occurs. It has been found in practice that failure of the friction surface of the intermediate speed ratio reaction brake occurs because of this condition. It is an object of our invention, therefore, to overcome these shortcomings in the valve systems of the type above described and to provide a coasting boost pressure characteristic that will be available when the gear system assumes an intermediate speed ratio as the vehicle coasts under high speed conditions. We do not anticipate that the augmented control system pressure will be required when the vehicle is coasting with the gear system in a higher speed ratio.

It is a further object of our invention to provide a valve system for an automatic power transmission mechanism of the type above set forth and which includes a driver controlled selector valve that may enable the vehicle operator to select either of two forward drive ranges, one automatic upshift being available during operation in one range and two automatic upshifts being available during vehicle acceleration in the other range. The manual selector valve should be capable also of conditioning the mechanism for operation in an underdrive ratio in which no upshifts are available. We contemplate that the valve system of our invention will include a coasting boost valve arrangement that will respond to a control signal in a pressure passage that is pressurized upon movement of the manual valve to a position that will effect operation in either one or the other of the forward drive ranges, but which is exhausted during operation in the low speed ratio range.

It is a further object of our invention to provide a coasting boost valve arrangement of the type above set forth and which is capable of establishing a fluid connection between the regulator valve and the pressure chamber for the servo that establishes intermediate speed ratio operation in the gear system.

It is a further object of our invention to provide a control system for an automatic multiple speed ratio power transmission mechanism having at least two friction brake reaction points that may be used selectively to establish either one of two underdrive ratios, and wherein provision is made for increasing the capacity of the brake that is engaged during operation in the highest of the underdrive ratios as the vehicle assumes a coasting condition.

It is a further object of our invention to provide an automatic control valve system of the type above set forth and which includes further a driver controlled manual valve that enables the operator to select either of two forward drive operating ranges or a forward coasting range. We contemplate that the manual valve will distribute a signal pressure, when it assumes the forward drive range condition, to inhibit operation of the valve components that function to establish the line pressure boost. In this way a pressure boost would not be available during normal coasting operation.

It is a further object of our invention to provide an improved valve system as set forth in the preceding object wherein the line pressure boost valve elements are sensitive to vehicle speed and are rendered ineffective to establish a line pressure boost at speeds that are less than a predetermined value.

*Particular description of the invention*

Figure 1:
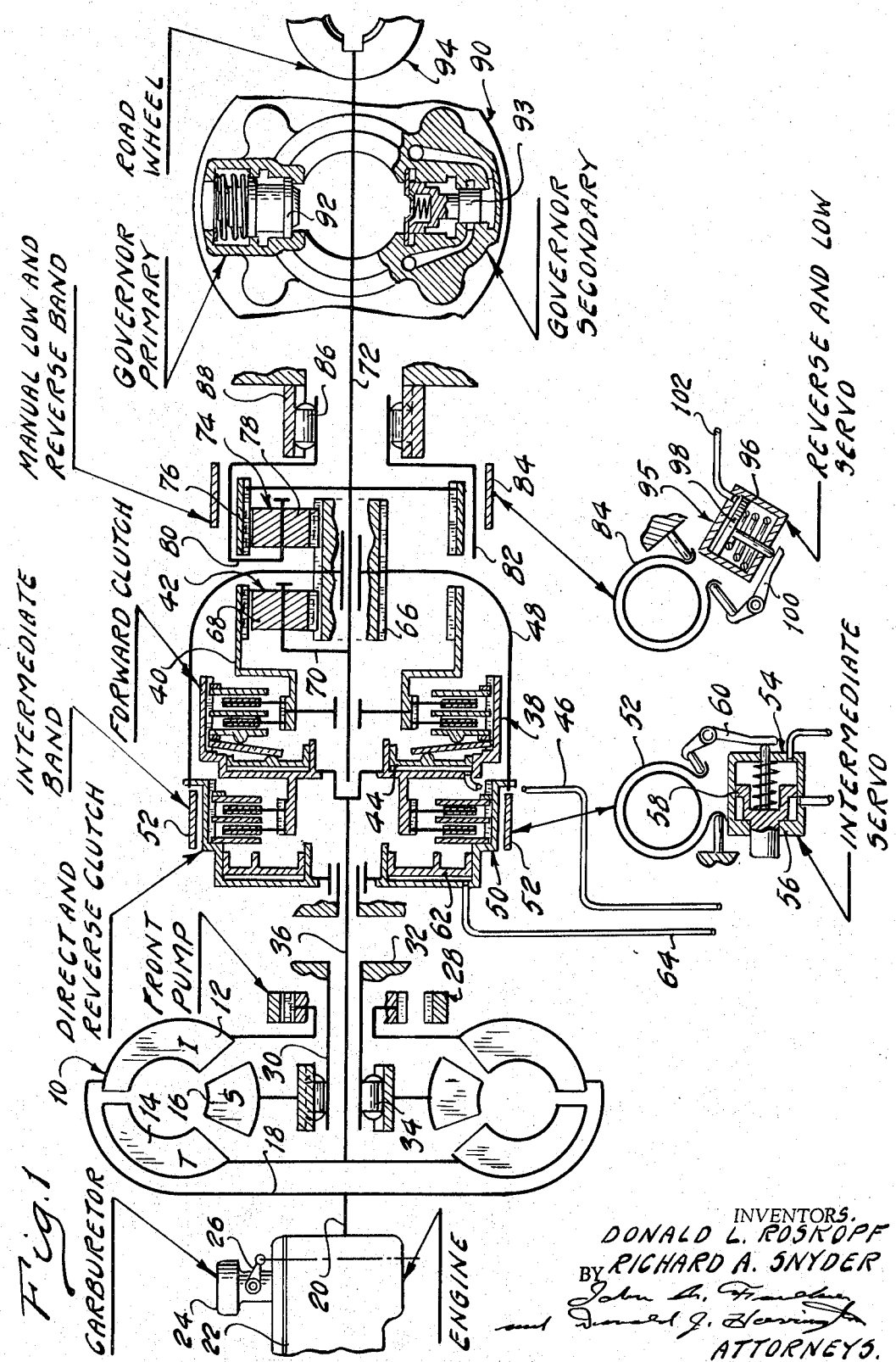
FIGURE 1 shows in schematic form a power transmission mechanism capable of embodying our improved valve system.

In the transmission mechanism shown in FIGURE 1, the hydrokinetic torque converter unit is designated generally by reference character 10. It includes a bladed impeller 12, a bladed turbine 14 and a bladed stator 16. The impeller, the turbine and the stator are situated in the usual fashion in toroidal fluid flow relationship to define a torus circuit. Impeller 12 is connected by means of a drive shell 18 to a crankshaft 20 of an internal combustion engine 22. The engine 22 includes an air-fuel mixture intake manifold having a carburetor 24 and a driver controlled carburetor throttle valve 26.

Impeller 12 is connected drivably to a positive displacement pump 28, which serves as a pressure source for the transmission control system to be described subsequently.

The stator 16 is journaled rotatably upon a stationary stator sleeve shaft 30, which is connected to the relatively stationary housing shown in part at 32. An over-running brake 34 is provided for locking the stator 16 against rotation in one direction with respect to the stator sleeve shaft 30 although it is capable of permitting free-wheeling motion of the stator 16 in the direction of rotation of the impeller during coupling operation of the converter 10.

A turbine shaft 36 is connected drivably to the turbine 14. It extends axially and is connected directly to a driving portion of a forward drive clutch shown at 38. The driven portion of the clutch 38 is connected directly to a ring gear 40 for a first planetary gear unit 42. The clutch 38, can be applied and released selectively by means of a fluid pressure operated servo, which includes a piston 44 drivably situated within an annular cylinder defined by the driving clutch portion. The piston 44 and its cooperating annular cylinder define a pressure cavity that is in fluid communication with a pressure feed passage 46.

A drive shell 48, which encircles the planetary gear unit 42, is connected drivably to a driven portion of a direct and reverse friction clutch structure 50. This driven portion defines a brake drum about which is positioned a friction brake band 52 which can be applied and released by means of a fluid pressure operated servo 54 to anchor the drive shell 48 selectively. Servo 54 includes a servo cylinder 56 within which is positioned a double acting piston 58. The cylinder 56 and the piston 58 cooperate to define a pair of opposed fluid pressure servo chambers on either side of the piston 58. Each chamber can be supplied with fluid pressure through a separate feed passage as will be explained subsequently. The fluid pressure force applied to the piston 58 is transmitted to the operating end of brake band 52 by means of a mechanical connection illustrated at 60 in FIGURE 1. The other end of the brake band 52 is anchored against the transmission housing in the usual fashion.

The direct and reverse clutch 50 is applied and released by means of a fluid pressure operated servo which included an annular cylinder formed by the driven portion of clutch 50 and by a cooperating annular piston 62. The piston 62 and its cooperating annular cylinder define a pressure chamber that is in fluid communication with a pressure feed passage 64.

Drive shell 48 is connected drivably to a long sun gear 66, which is common to both the planetary gear unit 42 and a second planetary gear unit 74. Planetary gear unit 42 includes a set of planetary pinions 68 which are journaled rotatably upon a planetary carrier 70. The carrier 70 in turn is connected drivably to power output shaft 72.

The planetary gear unit 74 comprises a ring gear 76, a set of planetary pinions 78 and a carrier 80, which journals rotatably the pinions 78. Ring gear 76 is connected drivably to the power output shaft 72.

The carrier 80 defines a brake drum 82 about which is positioned a friction brake band 84. Brake drum 82 is connected to the inner race of an overrunning brake which includes roller elements 86 situated within cam recesses formed in an outer race 88. Race 88 is connected directly to the transmission housing.

Roller elements 86 cooperate with the cammed surfaces formed in the race 88 to inhibit rotation of the carrier 80 in one direction, but overrunning motion in the opposite direction is permitted.

A compound governor valve assembly indicated generally by reference character 90 is connected to power output shaft 72. This governor valve assembly forms a portion of the control valve system that will be described subsequently. It includes a primary governor 92 and a secondary governor 93, which are effective to produce a useful pressure signal that is proportional in magnitude to the driven speed of shaft 72. The signal is utilized by the valve system to initiate shift points and to perform other control functions. The governor valve assembly is supplied by pressure from the front pump 28.

Shaft 72 is connected to the road wheels for the vehicle as shown at 94 by means of a conventional drive shaft and differential and axle assembly.

Brake band 84 may be applied and released by means of a fluid pressure operated servo 95 which comprises a servo cylinder 96 within which is positioned a servo piston 98. The fluid pressure force applied to the piston 98 is transmitted to the working end of the brake band 84 by means of a suitable connection shown schematically at 100. The other end of the brake band 98 forms a reaction point since it is connected to the stationary housing. The piston 98 and the cylinder 96 cooperate to define a pressure working chamber that may be supplied with fluid pressure through passage 102.

Low speed ratio operation is obtained by engaging the forward clutch 38. This causes a driving connection to be established between turbine shaft 36 and ring gear 40. The engine torque that is delivered to the impeller 12 is multiplied by the converter 10 to produce a turbine torque in shaft 36 that varies from a maximum at stall to a value approximately equal to the impeller torque when the converter unit 10 assumes a coupling condition. The turbine torque in shaft 36 is distributed through engaged forward clutch 38 to ring gear 40 thereby causing a forward driving torque to be imparted to the carrier 70 of the power output shaft 72. Since shaft 72 resists rotation, sun gear 66 tends to be driven in a direction opposite to the direction of rotation of ring gear 40. This then causes ring gear 76 to be driven in the direction of rotation of the ring gear 40 as carrier 80 is anchored to the housing through the overrunning brake shown in part at 86. Thus the carrier 80 acts as a reaction point for the gear system as shaft 72 is driven in a forward driving direction at a reduced speed ratio relative to shaft 36.

Continuous operation in the low speed ratio can be achieved by applying low-and-reverse brake band 84. This anchors the carrier 80 against rotation in either direction. The gear system thus is capable of accommodating torque delivery from the road wheels 94 to the engine or from the engine to the road wheels.

To condition the mechanism for an upshift from the low speed ratio to the intermediate speed ratio, brake band 52 is applied thereby anchoring sun gear 66. This causes the sun gear 66 to act as a reaction point, and the carrier 70 is driven at an increased speed relative to the speed of shaft 36. The overrunning brake shown in part at 86 freewheels under these conditions. The direct and reverse clutch 50 and the brake band 84 are released while the clutch 38 remains applied.

To condition the mechanism for an upshift to a direct drive high speed ratio, both brake bands are released and both clutches are applied. This causes the sun gear 66 to become locked to the carrier 70 so that the elements of the gear system rotate in unison with a 1:1 speed ratio.

Reverse drive operation is obtained by applying brake band 84 and by engaging the direct and reverse clutch 50 while the forward clutch 38 is released. Brake band 52, of course, is released also. Turbine torque from shaft 36 then is distributed to the sun gear 66 while the carrier 80 is anchored against rotation. Ring gear 76 then is driven in a reverse direction thereby driving the shaft 72 in a reverse direction.

If the vehicle is coasting at a speed that is greater than a predetermined minimum speed and if the operator desires to condition the gearing for manual low operation, provision is made in the automatic control system subsequently to be described for engaging the brake 52. Thus the sun gear 66 becomes a reaction point as the wheels 94 drive the engine crankshaft 20. Provision is made in the automatic control valve system for increasing the capacity of the servo 54 so that slippage will not occur when the coasting brake torque delivery requirements are relatively high. After the minimum calibrated speed is achieved, brake band 52 becomes released as brake band 84 becomes applied. Further coast braking operation then occurs in the lowest speed ratio rather than the intermediate speed ratio. The capacity of the servo 95 can be made sufficient to accommodate the coasting brake torque delivery since the magnitude of this torque is not high enough at speeds less than a predetermined minimum value to present a design problem.

In FIGURES 2, 3, 4 and 5, we have illustrated in schematic form a valve system that is capable of establishing sequential operation of the clutches and brakes for the transmission system of FIGURE 1. The principal valve components of the valve system of FIGURES 2 and 3 include a main regulator valve 104, a pressure booster valve 106, a coasting boost valve 108, a 1–2 shift valve 110, a 2–3 shift valve 112, a 2–3 backout valve 114, a primary throttle valve 116, a governor valve assembly 118, a throttle booster valve 120, a downshift valve 122, a 1–2 shift capacity accumulator valve 124, a 3–2 coasting control valve 126 and a manual control valve 128.

With the exception of valves 104, 106 and 108, the specific characteristics of the other valves in the system will be described only in general terms to permit an understanding of the environment in which the coasting boost valve arrangement of our invention may be used. For a more complete description of the valve system as a whole, reference may be made to aforementioned copending applications of John J. Searles.

The main regulator valve 104 is effective to control the discharge pressure of pump 28 before the pressure is distributed to the manual valve for redistribution to the various components of the valve system. The main regulator valve includes a multiple land valve spool 130 having spaced valve lands 132, 134 and 136. These are slidably situated within a valve chamber 138 having internal valve lands that register with the external valve lands of valve spool 130.

The discharge side of the pump 28 is in fluid communication through a passage 140 with the chamber 138 at a location intermediate lands 134 and 132. It also is in fluid communication with the upper end of land 136.

Another valve land 142, which seals the end of the chamber 138, cooperates with the land 136 to define a differential area on which the pressure in passage 140 may act.

A low pressure return passage 144, which extends to the transmission sump defined by the lower portion of the transmission housing for the gear system of FIGURE 1, communicates with the chamber 138 at a location intermediate lands 134 and 136.

Figure 2:
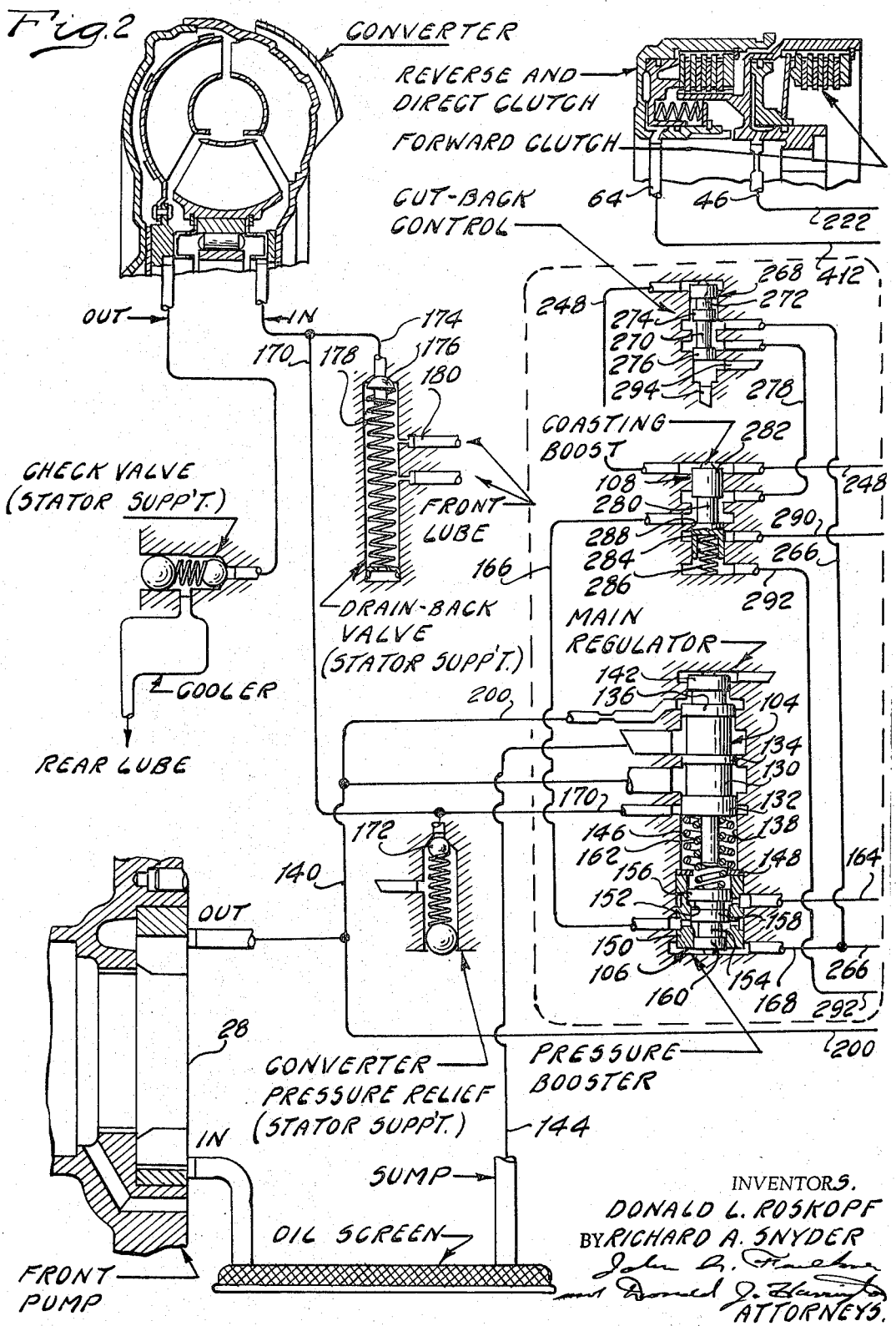
FIGURE 2 is a schematic representation of a portion of the valve system for controlling the operation of the servos of the transmission mechanism of FIGURE 1.
Figure 3:
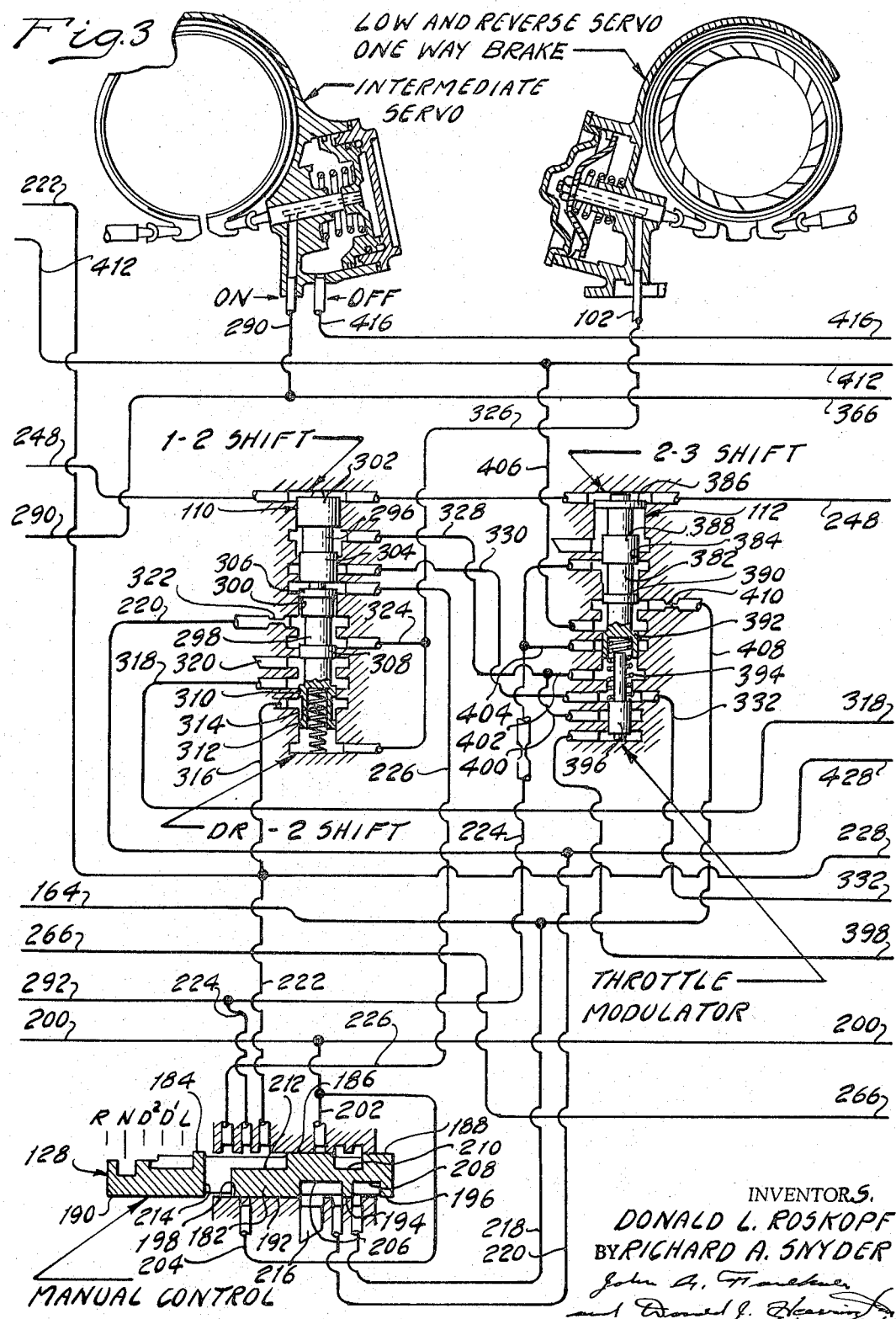
FIGURES 3 and 4 are schematic representations of another portion of the valve system of which FIGURE 2 forms a part.
Figure 4:
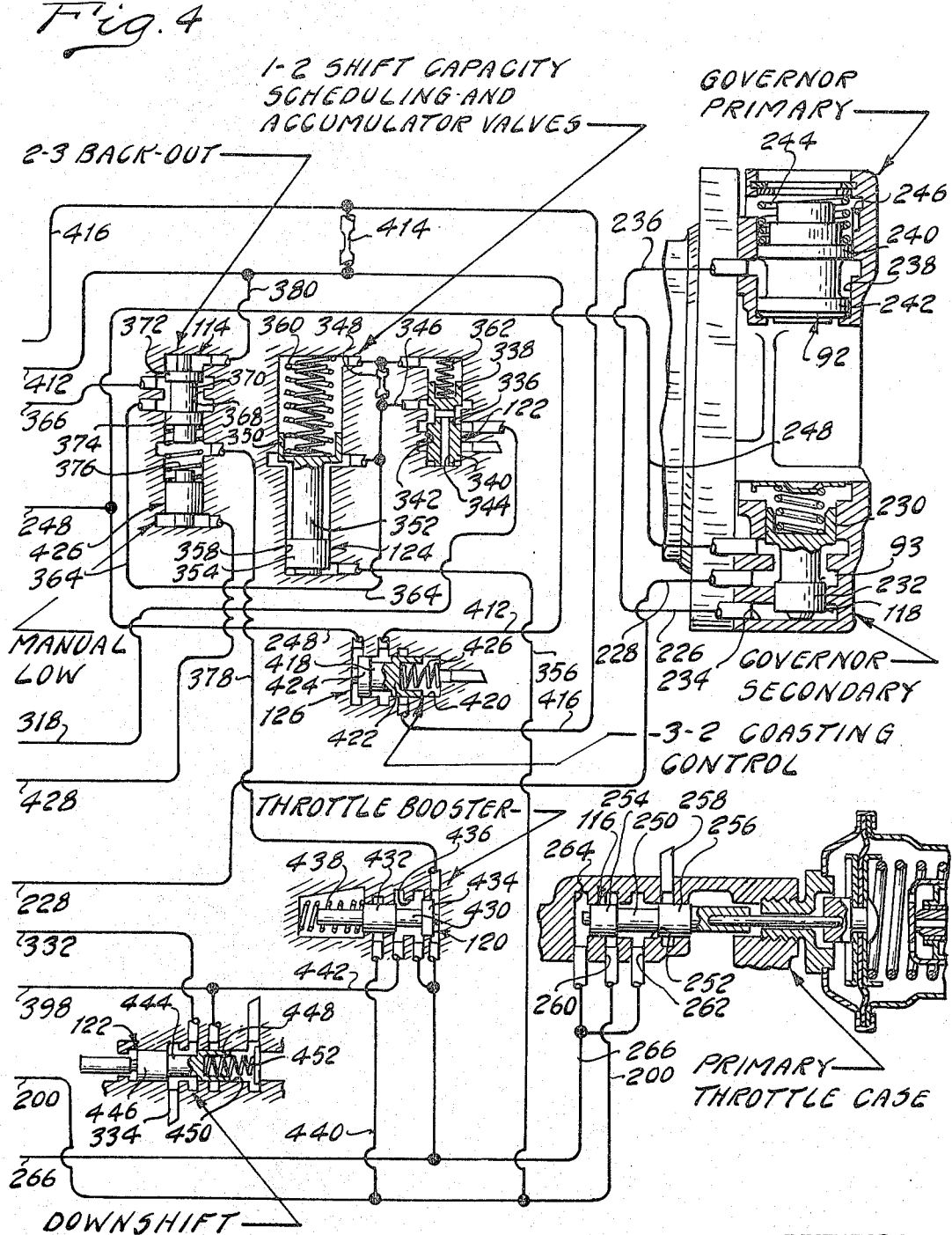
Figure 5:
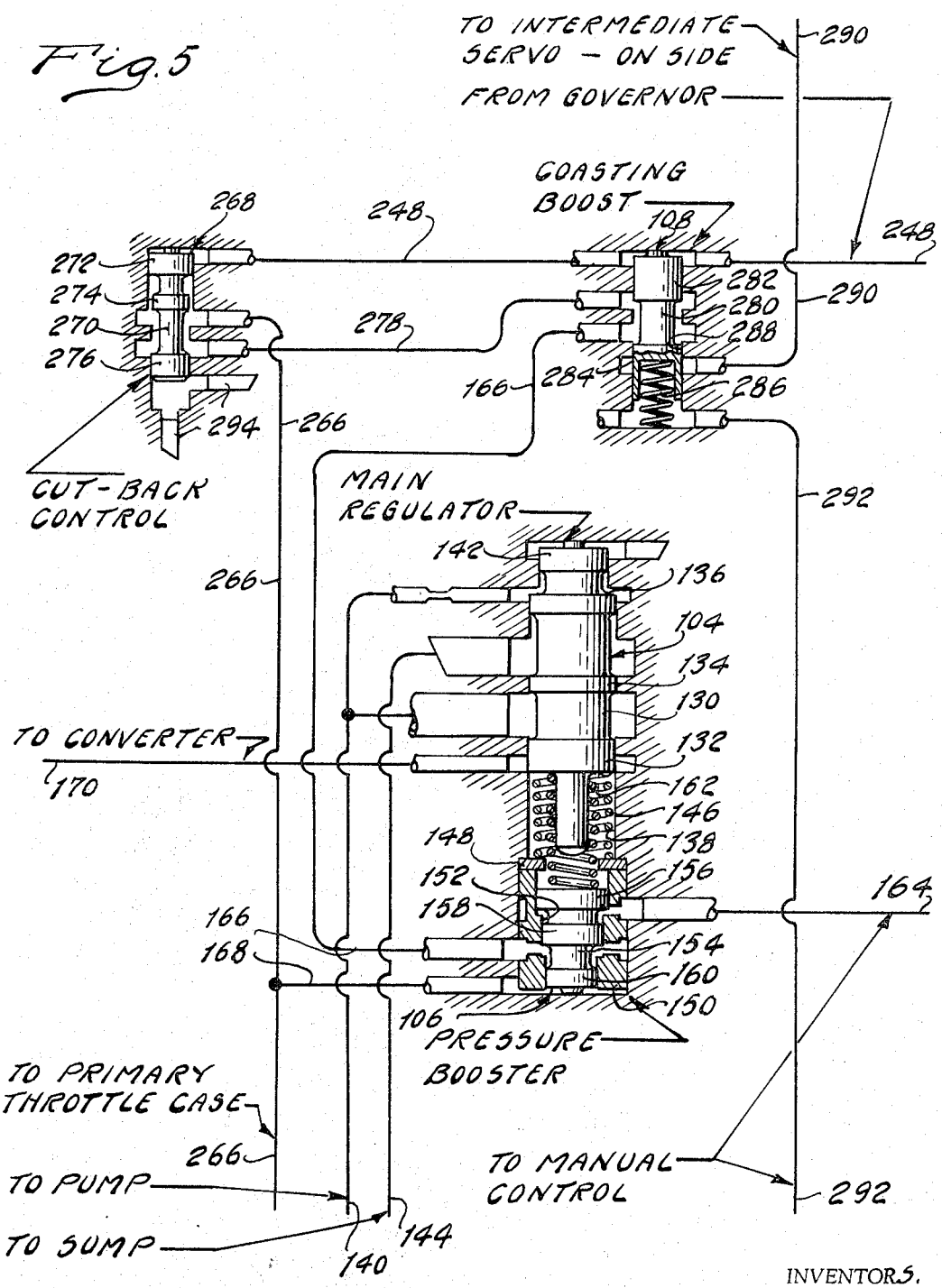
FIGURE 5 is an enlarged view of a portion of FIGURE 2.

Valve spool 130 is biased in an upward direction, as viewed in FIGURE 2, by a first valve spring 146 which is anchored on a fixed shoulder 148 carried by the valve body within which the chamber 138 is formed. If desired, shoulder 148 may engage a valve sleeve 150 which is formed with a valve opening 152 for receiving a pressure booster valve element 154. This valve element has spaced valve lands 156, 158 and 160, which register with internal valve lands formed in the sleeve 150. A second valve spring 162 is situated between valve spool 130 and valve element 154.

Lands 156 and 158 define a differential area that is in fluid communication with a pressure passage 164 which is pressurized when the transmission system is conditioned for reverse drive operation. It is exhausted, however, when the transmission system is conditioned for forward drive operation.

Valve lands 158 and 160 also define a differential area which is in fluid communication with a passage 166 extending to the coasting boost valve subsequently to be described. Normally the passage 166 is subjected to throttle pressure during initial acceleration from a standing start, but it is exhausted by the cutback control valve which also will be described subsequently.

If the vehicle is coasting at a relatively high speed and if the valve system is conditioned for operation in the manual low drive range, the coasting boost valve will cause high pressure to be distributed to passage 166 thereby causing a line pressure boost due to the fact that the main regulator valve will be caused to regulate at a higher pressure level. The pressure force due to the pressure that exists in passage 166 then will supplement the spring force acting upon the valve spool 130. If the vehicle is coasting at a value that is less than a predetermined value when the transmission system is conditioned for operation in the manual low drive range, passage 166 becomes connected to the cutback control valve so that it will be pressurized in the usual fashion.

The lower end of land 160 is subjected to throttle pressure which is distributed to it through a branch passage 168. The term throttle pressure is defined as that signal pressure that is produced by the primary throttle valve 116. The existence of this throttle pressure causes the main regulator valve to respond to changes in engine intake manifold pressure so that the torque transmitting capacity of the pressure operated servos and friction members in the transmission system will be maintained regardless of changes in driving torque.

A converter circuit feed passage 170 communicates with the valve chamber 138 at a location adjacent land 132. This land controls communication between line pressure passage 140 and feed passage 170. A converter pressure relief valve shown at 172 is situated in the passage 170 to prevent an excessive pressure build-up in the converter if the regulator valve 104 should fail to function properly.

Situated in parallel relationship with respect to relief valve 172 is a drainback valve comprising a pressure passage 174 which normally is closed by a one-way check valve element 176. A light spring 178 acts upon the valve element 176 and maintains it in a closed position whenever the pressure in passage 170 is 5 p.s.i. or less. It allows the valve element to unseat, however, when the pressure in passage 170 exceeds 5 p.s.i.

After the engine is stopped, the valve element 176 will prevent drainage of the torus circuit of the torque converter. It is not necessary, therefore, for the pump to refill the torque converter each time the engine is started. The downstream side of the valve element 176 communicates with the low pressure lubrication system shown in part at 180.

The manual control valve 128 includes a movable valve element 182 having a plurality of lands formed thereon. The lands on the upper side of valve element 182 are indicated at 184, 186 and 188. The lands on the lower side of the valve element 182 are shown at 190, 192, 194 and 196. Valve element 182 is slidably situated within a valve chamber 198 which is formed with internal valve lands that register with the lands formed on valve element 182.

A line pressure passage 200 communicates directly with the discharge side of the pump 28. It extends to branch passages 202 and 204 which communicate with the valve chamber 198 as indicated. The valve element 182 can be adjusted to any one of several positions to establish three forward drive ranges and a single reverse drive range, as well as a neutral. The positions corresponding to the three forward drive ranges are designated by the symbols D2, D1 and L, respectively.

When the manual valve is shifted to the D2 position, the transmission mechanism is capable of delivering vehicle accelerating torque in the intermediate speed ratio. As the vehicle is accelerated from a standing start, a single speed ratio upshift may be obtained as the transmission mechanism is conditioned for direct drive operation. If the manual valve is shifted to the D1 position, two automatic upshifts are available and the vehicle can be caused to accelerate from a standing start in the lowest transmission speed ratio.

If the manual valve is shifted to the L position and if the vehicle is stationary, the transmission will continue operating in the lowest speed ratio and no automatic upshifts are available. If the manual valve is shifted to the L position while the vehicle is traveling at a speed greater than a predetermined value, the transmission mechanism immediately will assume an intermediate speed ratio condition. If the vehicle speed subsequently is reduced—for example, as the vehicle speed falls-off during coasting—the transmission will assume an automatic downshift to the lowest speed ratio and thereafter the transmission will continue operating in the lowest speed ratio with no speed ratio upshifts regardless of changes in vehicle speed or engine torque.

If the manual valve is shifted to the R position, the transmission will be conditioned for reverse drive operation only. There are no speed ratio changes during reverse drive.

If the manual valve is shifted to the N position, the torque delivery paths through the transmission system are interrupted.

Valve cavities are formed in the valve element 182. A first cavity 206 is situated between the lands 192 and 194. A second cavity 208 is situated between the lands 194 and 196. A third cavity 210 is situated between the lands 186 and 188. A fourth cavity 212 is situated between the lands 184 and 186 and a final cavity 214 is situated between the lands 190 and 192. Cavity 212 is in fluid communication with cavity 214 through the center of the valve element 182. An exhaust port 216 communicates with the chamber 198 at a location adjacent land 192. The two ends of the valve chamber 198 also form exhaust ports.

A pressure passage 218 extends to the valve chamber 198 and communicates therewith by means of an internal groove formed in chamber 198. When the manual valve element 182 is shifted to the reverse position R, communication is established between passage 202 and cavity 210. Another pressure passage 220 communicates with the chamber 198 at a location adjacent exhaust port 216.

When the manual valve element 182 assumes the reverse position R, pressure is distributed from passage 202 and through the cavity 210 to the passage 220. Communication between the passage 220 and the chamber 198 is established by an internal annular groove formed in chamber 198.

Simultaneously with distribution of pressure to passage 220, pressure is distributed also to passage 218 through the cavity 208. At the same time the right-hand end of the chamber 198 is blocked by land 196 and by land 188. Passage 204 becomes blocked by land 192.

Three other passages communicate with the valve chamber 198 as shown at 222, 224 and 226. These are situated in adjacent relationship, and communication between each of them and the chamber 198 is controlled by spaced valve lands 186 and 184. When the element 182 asumes the reverse drive position R, each of the passages 222, 224 and 226 is exhausted through the left-hand end of the chamber 198.

If the valve element 182 is shifted to the manual low drive range position L, passage 204 becomes blocked by land 190. Passage 202 is brought into communication with passage 222 through cavity 212. It also is brought into communication with passage 220 through the cavity 212 and the annular groove through which passage 220 communicates with chamber 198. If the manual valve element 182 is shifted to the D1 position, both passages 220 and 218 are brought into communication with the exhause port at the right-hand end of the valve chamber 198. At the same time passages 202 and 204 are brought into fluid communication with both passages 222 and 224. Passage 226, however, is exhausted through the left-hand end of the valve chamber 198.

If the manual valve element 182 is shifted to the second drive range position D2, passage 204 is brought into communication with each of the passages 222, 224 and 226 through the communicating cavities 214 and 212. Passage 202 becomes blocked by land 188. Passages 218 and 220 are brought into communication with exhaust port 216 through the cavity 206.

Passage 222 extends directly to the forward clutch 38. Since passage 222 is pressurized whenever manual valve 182 is shifted to a forward drive range position, the forward clutch is applied at all times during forward drive. The pressurized fluid in passage 222 is distributed to the working chamber of the servo for clutch 38 through the feed passage 46 as explained previously.

The pressure in passage 222 is distributed also to a governor feed passage 228. This extends to the secondary governor valve element 93 of the governor valve assembly 118. This valve element 93 is formed with lands 230 and 232 having a differential area. An exhaust port 234 is formed in the governor valve chamber for valve element 93. That port is in fluid communication through passage 236 with a valve chamber 238 for the primary governor valve element 92. This valve element is formed with a pair of spaced valve lands 240 and 242 which register with internal valve lands formed in the chamber 238. Valve element 92 is urged radially inwardly by valve spring 244. An exhaust port 246 communicates with chamber 238.

At low tailshaft speeds valve element 92 assumes a radially inward position in which case passage 236 is blocked. When the tailshaft speed exceeds a predetermined value, however, valve element 92 is urged radially outwardly against the opposing force of spring 244 thereby establishing communication between passage 236 and the exhaust port 246. As soon as this occurs, valve element 93 is capable of modulating the pressure supplied to it through passage 228, the resultant modulated pressure acting on the differential area of lands 230 and 232. This modulated pressure is distributed to the valve system through governor pressure delivery passage 248. The modulated pressure in passage 248 is used as a vehicle speed signal whenever the vehicle speed is greater than a value corresponding to the calibrated tailshaft speed at which the primary valve element shifts. At a speed less than that value no speed signal is obtained.

The primary throttle valve 116 includes a valve element 250 which is positioned slidably within a valve chamber 252. This valve element includes a pair of spaced valve lands 254 and 256. An exhaust port 258 communicates with the chamber 252. Passage 200, which communicates directly with the discharge side of the pump 28, communicates with the chamber 254 through a port 260. A throttle pressure port 262 receives modulated pressure produced by the throttle valve 116. An end annular groove 264 is in communication with port 262. Throttle pressure is distributed from port 262 to a throttle pressure passage 266. This passage in turn distributes pressure to passage 168 which acts upon the lower land of the pressure booster valve 106.

Throttle pressure passage 266 communicates also with cutback control valve 268 which comprises a valve spool 270 having three axially spaced valve lands 272, 274 and 276. Land 272 is slightly larger than land 274 and the differential area thus defined is subjected to the throttle pressure in passage 266. This normally tends to urge the valve element 270 in an upward direction as viewed in the drawings thereby establishing communication between passage 266 and a branch passage 278. The coasting boost valve 108 is effective to establish communication between passage 278 and passage 166 when the vehicle is operating in either the D1 drive range or the D2 drive range. Coasting boost valve 108 comprises a valve element 280 having a pair of spaced valve lands 282 and 284. A valve spring 286 urges the valve element 280 in an upward direction as viewed in the drawings. Passages 278 and 166 communicate with the valve chamber 288 within which the element 280 is slidably positioned.

If the valve element 280 is shifted in a downward direction as viewed in the drawings, communication between passages 278 and 166 is blocked by land 282. At the same time communication between passage 166 and a passage 290 is established as land 284 uncovers passage 290.

The lower end of land 284 is subjected to pressure distributed to the coasting boost valve 108 through passage 292. This passage 292 is connected directly to passage 224 which, as explained previously, is pressurized when the manual valve is shifted to the D2 or D1 positions. It is exhausted, however, when the manual valve element assumes the L position.

Governor pressure in passage 248 acts upon the upper end of land 282. Thus if the passage 292 is exhausted and if the vehicle is coasting with the manual valve shifted to the L position, passage 166 is brought into fluid communication with passage 290. Passage 290 in turn extends to the apply side of the intermediate servo and is pressurized whenever the intermediate servo is applied. pressurized whenever the intermediate servo is applied. This pressure is distributed through passage 166 to the differential area on the pressure booster valve defined by lands 158 and 160. Thus the regulated pressure level of the main regulator valve is increased when the vehicle is coasting at high speeds when the manual valve is in the L position and when the intermediate servo is applied. Slippage of the brake band operated by the intermediate servo thus is prevented if the cutback control valve assumes the position shown.

Passage 166 normally is subjected to throttle pressure whenever the valve element 280 of the coasting boost valve 108 assumes the position shown. The pressure applied to the apply side of the intermediate servo through passage 290, however, is greater than the pressure in passage 166. If the cutback control valve is in a downward position, passage 278 is brought into fluid communication with an exhaust port 294 which communicates with a valve chamber within which valve element 270 is situated. The upper end of land 272 is subjected to governor pressure distributed to it through passage 248. The force of the governor pressure is opposed by the force of the throttle pressure in passage 266 which communicates with the valve chamber of cutback control valve 268 at a location adjacent land 274. The application and release of the intermediate servo and the low and reverse servo is controlled by 1-2 shift valve 110.

This valve comprises a pair of separate valve elements 296 and 298 which are slidably positioned within a common valve chamber 300. Valve element 296 comprises a pair of lands 302 and 304 the upper land 302 being in fluid communication with governor pressure passage 248. Valve element 298 comprises valve lands 306, 308, 310 and 312. A valve spring 314 normally urges the valve elements 298 and 296 in an upward direction as viewed in the drawings.

Passage 222 which communicates with the forward clutch feed passage 46 communicates with the chamber 300 through a branch passage 316. An intermediate servo feed passage 318 communicates with the chamber 300 at a location intermediate the passage 316 and an exhaust port 320. When the 1-2 shift valve assembly assumes the position shown in the drawings, passage 318 is in fluid communication with the exhaust port 320. On the other hand, when the 1-2 shift valve assembly assumes an upshift position, land 308 blocks communication between passage 318 and the exhaust port, and land 310 simultaneously establishes communication between passage 316 and passage 318.

Passage 220, which is pressurized when the manual valve element 182 assumes the L position or the R position as explained previously, communicates with the chamber 300 at a location intermediate lands 308 and 306. A flow restricting orifice 322 is situated in the passage 220 between the 1-2 shift valve assembly and the manual control valve. When the 1-2 shift valve assembly assumes the position shown in the drawings, communication is established between passage 220 and a branch passage 324 which extends to the low and reverse servo feed passage 102 through a passage 326. When passage 326 is pressurized, the lower end of land 312 also is pressurized thereby causing the 1-2 shift valve assembly to maintain a downshift condition. This prevents automatic upshifts whenever the low and reverse servo is pressurized.

If the transmission mechanism is conditioned for normal forward drive operation with the manual drive in the D1 or D2 positions, passage 220 is exhausted, as explained previously. In this case the low and reverse servo is not pressurized and the overrunning brake shown in part at 86 provides the necessary torque reaction during operation in the lowest speed ratio. Since passage 220 and passage 324 are exhausted, the 1-2 shift valve assembly is conditioned for automatic upshifts. Such upshifts are obtained in response to an increase in governor pressure in passage 248, which acts upon the upper surface of land 302. A modulated throttle pressure in passage 328 acts upon the differential area defined by lands 302 and 304 whereby opposing the force of the governor pressure signal in passage 248. When the magnitude of the governor pressure signal for any given magnitude of the pressure produced by the modulated throttle pressure in passage 328 reaches a predetermined value, the force of spring 314 and the force of the modulated throttle pressure is overcome thereby causing the 1-2 shift valve assembly to shift downwardly. This causes land 308 to block exhaust port 320 while land 310 uncovers passage 316. Communication then is established between passage 316 and passage 318, which extends through the 1-2 shift passage scheduling and accumulator valves and through the 2-3 backout valve to the apply side of the intermediate servo thereby causing the intermediate speed ratio brake to become applied.

A passage 330 which communicates with passage 332 through the throttle modulator valve, extends to the valve chamber 300. As the 1-2 shift valve assumes an upshift position, the differential area defined by lands 302 and 304 is disconenected from modulated throttle pressure passage 328 and is brought into communication with passage 330. This passage 330 is exhausted under normal driving conditions since it communicates with exhausted passage 332, the latter in turn extending through the downshift valve to an exhaust port 334. Passage 226, which extends from the manual valve, communicates with the 1-2 shift valve chamber 300 at a location intermediate valve elements 298 and 296. The pressure in passage 226 thus causes the valve element 298 to shift in a downward direction thereby causing communication between passages 316 and 318, which in turn results in the application of the intermediate servo as explained previously. The low and reverse servo has no opportunity to become applied since under these conditions passage 324 becomes connected to the exhaust port 320. Therefore, when the manual valve element 182 assumes the D2 position, the transmission mechanism is conditioned for acceleration from a standing start in the intermediate speed ratio rather than the lowest speed ratio.

The 1-2 shift capacity scheduling and accumulator valves 122 and 124, respectively, are adapted to control the application of the intermediate servo. The scheduling valve 122 comprises a valve element 336 having lands 338 and 340 which register with internal valve lands formed in valve chamber 342.

A central passage 344 communicates with passage 318 when the valve element 336 assumes the position shown in the drawings. Thus the pressure that is introduced into passage 318 upon a 1-2 upshift is distributed to the lower end of land 340 as well as to the upper end of land 338. Communication with the upper end of land 338 is established by branch passage 346 and by a flow restricting orifice 348, the passage 346 communicating with the chamber 342 at a location adjacent land 338. The pressure on the downstream side of the orifice 348 which is distributed to the upper end of land 338 acts also upon the upper end of land 350 of an accumulator valve spool 352. This valve spool includes also a land 354 which is smaller in size than the land 350. The lower end of land 354 is subjected continuously to the output pressure of the pump 28, a passage 356 being provided for the purpose of distributing fluid pressure from passage 200 to the lower end of valve chamber 358 within which the spool 352 is positioned. An accumulator valve spring 360 acts upon the upper end of valve spool 352 and a valve spring 362 acts upon the valve element 336 to urge the latter in a downward direction.

As pressure is introduced into passage 318 upon a 1-2 upshift, pressure is distributed across the scheduling valve 122 to passage 364 which extends to the 2-3 backout valve 114. The apply side of the intermediate servo is supplied with fluid pressure through a feed passage 366 which communicates with passage 364 through valve chamber 368 of the 2-3 back out valve 114.

The same pressure that is distributed to passage 366 is distributed also to the differential area defined by lands 354 and 350 of the accumulator valve 124. Upon a 1-2 upshift a pressure build-up will occur immediately in passages 364 and 366. At some predetermined value greater than zero but less than the maximum line pressure available, the accumulator valve element 352 will begin to stroke. This causes a flow to occur across the restriction 348. This upsets the normally balanced condition of the forces acting upon valve element 336. Thus the valve element 366 will begin to regulate the pressure made available to passage 364. The magnitude of the modification of the pressure produced by the scheduling valve 122 depends upon the rate at which the accumulator valve 124 is stroked. When the valve element 352 finishes its accumulation period the flow across the orifice 348 ceases and this again restores the pressure balance across the valve element 336. Thus the valve element 336 will assume again the position shown in the drawings thereby establishing full pressure in passage 364 and in passage 366. The intermediate servo then becomes applied with its full engaging pressure.

The 2-3 backout valve 114 is designed to cushion the engagement of the reverse and direct clutch when the vehicle is accelerated in an underdrive ratio and an upshift to the highest speed ratio is initiated when the engine manifold pressure is at a minimum. Valve 114 includes a spool 370 which is situated within the chamber 368. It is formed with spaced valve lands 372 and 374. A valve spring 376 normally urges the spool 370 in an upward direction as viewed in the drawings. Throttle pressure is distributed to the lower end of valve land 374 through a passage 378. This passage communicates with throttle pressure passage 266.

The reverse and direct clutch servo feed passage 64 communicates with the upper end of land 372 through a branch passage 380.

When the transmission is caused to shift from an underdrive ratio to the direct drive ratio while the engine is delivering torque, the magnitude of the throttle pressure in passage 378 is sufficient to maintain the valve element 370 in the upward position until the reverse and direct clutch becomes fully applied and the intermediate servo becomes released. If such an upshift occurs when the throttle pressure in passage 378 is at a minimum, however, a build-up in pressure in the forward drive clutch will cause valve element 370 to shift in a downward direction. This causes passage 366 to be uncovered by land 372 so that passage 380 is brought into communication with passage 366. Thus the apply side of the intermediate servo becomes connected to the feed passage 64 for the reverse and direct clutch. Communication between passage 366 and passage 364 temporarily is interrupted. After the engine carburetor throttle setting is advanced, however, the modulated throttle pressure will be sufficient to cause the valve element 370 to shift again to the upward position thereby directly connecting passages 364 and 366. This occurs, however, only after the reverse and direct clutch becomes applied.

A speed ratio change from the intermediate speed ratio to the high speed direct drive ratio is controlled by the 2-3 shift valve assembly. This assembly comprises a multiple land valve spool 382 slidably situated within a valve chamber 384 having multiple internal valve lands. These internal valve lands register with lands 386, 388, 390 and 392 which are formed on the element 382. A valve spring 394 acts upon the valve element 382 and urges it normally in an upward direction. Spring 394 is seated upon a throttle modulator valve 396 which is situated slidably within a valve chamber that is in communication with chamber 384. The upper end of the valve chamber for element 396 communicates with exhausted passage 332 and the lower end of valve element 396 communicates with a passage 398, which is subjected to the output pressure of the throttle booster valve 120.

The pressure in passage 398 is modulated by the valve element 396 to produce a resultant pressure in passage 400 which is distributed to passage 402, the latter extending to the lower end of land 392 of the 2-3 shift valve assembly and also to the differential area of lands 302 and 304 of the 1-2 shift valve assembly as explained previously. Communication between passage 402 and the 1-2 shift valve assembly is established by the previously described passage 328.

Whenever the manual control valve element 182 assumes the D2 position or the D1 position, passage 224 is pressurized. This passage communicates with the valve chamber 384 at a location intermediate lands 388 and 390. It communicates also with a branch passage 404 which extends to the valve chamber 384 at a location adjacent land 392.

Passage 406, which communicates with the reverse and direct clutch servo feed passage 64, communicates with the chamber 384 at a location intermediate lands 392 and 390. Communication then is established between passage 406 and exhausted passage 408. As explained previously, passage 408 is pressurized only when the manual valve assumes the R position. A flow restricting orifice 410 is situated in passage 408 to control the rate of release of the reverse and direct clutch and the rate of application of the intermediate servo.

Governor pressure in passage 248 acts upon the upper end of land 386 and produces a force that opposes the force of the modulated throttle pressure acting on the lower end of the land 392. It opposes also the force of spring 394. When the magnitude of the vehicle speed for any given magnitude of the modulated throttle pressure exceeds a predetermined value, the 2-3 shift valve element 382 assumes a downward position. This causes land 392 to uncover passage 404 thereby establishing communication between passages 404 and 406 while interrupting communication between passages 406 and 408. At the same time the differential area defined by lands 390 and 388, which is pressurized by the pressure in passage 224 when the valve element 382 assumes the position shown, is exhausted through the passage 408 upon a 2-3 upshift. This produces a hysteresis effect and prevents hunting of the 2-3 shift valve between the high speed position and the intermediate speed position. As passage 406 becomes pressurized in this fashion, pressure is distributed simultaneously to passage 64 and to the release side of the intermediate servo. Communication with the release side of the intermediate servo is established by a passage 412 and a flow restricting orifice 414. The downstream side of the orifice is in communication with the release side of the intermediate servo through a feed passage 416. Thus as the 2-3 shift valve assembly assumes an upshift condition, pressure is distributed simultaneously to the reverse and direct clutch and to the release side of the intermediate servo.

As explained previously, if the manual valve is moved to the L position and the vehicle engine throttle is relaxed to produce a coasting condition as the vehicle travels at a speed greater than a predetermined value, the shift valves will respond to cause a downshift to the intermediate speed ratio prior to application of the reverse and low servo. This is due to the fact that passage 224, which normally supplies the reverse and direct clutch, now is exhausted. At the same time, however, the pressure that is introduced to passage 220 upon movement of the manual valve element 182 to the L position acts upon the differential area produced by the lower end of land 306 of the 1-2 shift valve element 298. This force is insufficient, however, to move the valve element 298 and the valve element 296 in an upward direction when the governor pressure acting upon the upper end of land 302 exceeds a predetermined value. As soon as the governor pressure falls to a sufficiently low value, however, the 1-2 shift valve assembly is moved in an upward direction. At that time the apply side of the intermediate servo becomes exhausted and communication is established between passage 220 and passage 324 which extends to the feed passage 326 for the low and reverse servo.

To cushion the application of the intermediate speed ratio brake band during coasting operation following operation in the direct drive ratio, there is provided a 3-2 coasting control valve 126. This valve comprises a valve spool 418 situated within a valve chamber 420. Passage 412 communicates with the chamber 420 at a location intermediate valve lands 422 and 424. Governor pressure passage 248 communicates with the left-hand side of land 424. The force produced by the governor pressure is opposed by the force of valve spring 426. The passage 416 communicates with valve chamber 420 at a location adjacent land 422. If the vehicle is coasting in the high speed ratio at a relatively high speed, the valve element 418 will be shifted in a right-hand direction thereby providing communication between passage 416 and passage 412. The latter being exhausted through passage 408 as the 2-3 shift valve moves to the downshift position. The orifice 414 in the pressure release passage for the intermediate servo thus is bypassed. If the vehicle is coasting at a relatively low speed, however, an automatic 3-2 coasting downshift will occur when the valve 418 is in a left-hand direction. Under these conditions the intermediate servo release is delayed somewhat since the fluid pressure that must be displaced by the intermediate servo piston then is forced to pass through the orifice 414 before it can be exhausted to the exhaust region. The rate of application of the intermediate servo on a coasting downshift thus can be controlled in accordance with vehicle speed.

A manual low valve element 426 is situated slidably within a valve chamber that is common to the valve chamber 368 for the backout valve 114. Spring 376, which acts upon the valve element 370 of the backout valve 114 is seated upon the valve element 426.

Passage 220, which is pressurized when the manual valve assumes either the low position or the reverse position, communicates with passage 428 which in turn extends to the manual low valve chamber at a location below the manual valve element 426. Thus whenever the transmission mechanism is conditioned for operation in manual low the manual valve element 426 is shifted under the influence of the pressure in passage 428 to an upward position. This causes the backout valve element 370 to assume the position shown in the drawings.

The torque signal that is made available to the 1-2 shift valve and the 2-3 shift valve is obtained by the throttle booster valve 120. This valve includes a valve element 430 having a pair of spaced valve lands 432 and 434. Land 434 is slightly larger in diameter than land 432. Each land registers with an internal valve land formed in a valve chamber 436 for the valve element 430. Throttle pressure in passage 378 communicates with the chamber 436 and acts upon the right-hand end of land 434 to urge the element 430 in a left-hand direction against the opposing influence of valve spring 438. Line pressure from the line pressure passage 200 is distributed to the valve chamber 436 through a branch passage 440. The degree of communication between passage 440 and the chamber 436 is controlled by land 432. Primary throttle valve pressure is distributed from passage 266 to the chamber 436 at a location intermediate lands 432 and 434. The output pressure passage for the throttle booster valve 120 is shown at 442. As the primary throttle valve pressure increases, the degree of communication between passage 266 and passage 442 is decreased and the degree of communication between line pressure passage 440 and passage 442 is increased. This results in an augmentation in the magnitude of the effective pressure signal made available to passage 442. It is this augmented signal that is distributed to passage 398 and hence to the throttle modulator valve element 396.

The magnitude of the primary throttle valve pressure in passage 266 is an approximate indicator of engine torque. It is not an accurate indicator of engine torque demand, however, when the engine carburetor throttle setting is advanced. This is due to the fact that the engine manifold pressure does not vary linearly with respect to changes in the engine carburetor throttle setting at advanced throttle positions. Thus the signal produced by the primary throttle valve is not a useful signal for establishing the shift points although it is useful for the purpose of varying the magnitude of the line pressure. Hence, the passage 266 communicates directly with the pressure booster valve, but the signal that is made available to the shift valves is modified by the throttle booster valve to produce a signal that is consistent with the calibration requirements.

The automatic speed ratio shift tendencies of the 1-2 shift valve and the 2-3 shift valve can be overruled by the downshift valve 122. The valve comprises a valve element 444 having a pair of lands 446 and 448 that are slidably situated within a valve chamber 450. A valve spring 452 acts upon the element 444 and urges it normally in a left-hand direction as viewed in the drawings. Passage 332, which normally is exhausted through exhaust port 344 through the downshift valve chamber 450, is adapted to communicate with throttle booster valve output pressure passage 442 through the downshift valve chamber 450 when the valve element 444 is shifted in a right-hand direction. Movement of the valve element 444 is under the control of the vehicle operator. For this purpose a mechanical linkage is provided between the driver controlled engine carburetor throttle valve and the valve element 444.

If manual control valve element 182 is shifted to the L position while the operator relaxes the engine carburetor throttle setting, the reverse and direct clutch will become exhausted immediately since passage 224 will be brought into communication with the exhaust port at the left-hand end of the manual valve chamber. The forward clutch, of course, remains applied since passage 222, as previously explained, is pressurized in all forward drive ranges including the low drive range L. Passage 220 also is pressurized, as explained previously, when the manual valve element 182 assumes the L position. Thus a pressure force will be established by reason of the fact that the differential area of the lower end of land 306 of the 1-2 shift valve assembly will be pressurized with line pressure. This force is opposed, of course, by the governor pressure signal acting upon the upper end of land 302. Thus if the vehicle speed is low enough, the addition of a control pressure force on land 306 will cause the 1-2 shift valve to assume a downshift position. Since the forward clutch is applied, the transmission then will immediately assume a low speed ratio condition since pressure then will be distributed directly from passage 220 to passage 324, which communicates with the passages 326 and 102 extending to the low and reverse servo. If the speed of the vehicle is greater than a predetermined value, however, the governor pressure force acting upon the land 302 will be great enough to overcome the opposing influence of the line pressure force on land 306. Thus the 1-2 shift valve will remain in an upshift position following movement of the manual valve element 182 to the L position. Instead of assuming the lowest speed ratio, the transmission system then will assume an intermediate speed ratio during coasting at high speeds.

Our improved control system is capable of establishing the necessary line pressure boost during coasting operation at high speeds when the intermediate servo applies the intermediate speed ratio brake band. It is at this time that the capacity increase is required. It is not required during operation of the transmission system in the lowest speed ratio with the low and reverse servo applied. Neither is a line pressure boost required when the transmission system is coasting with the manual valve in the D2 or D1 position when the transmission mechanism is operating in direct drive with the reverse and direct clutch engaged. If a line pressure boost is obtained under these conditions, the pump 28 is unnecessarily overloaded and premature pump failure will occur. Thus we have provided a pressure boost only in those instances when the boost is required and have avoided overloading the pump 28 when such an overload is not necessary.

In carrying forth this objective the coasting boost valve senses the introduction of control pressure to the apply side of the intermediate servo. Hence, passage 290 connects the valve chamber 288 of the coasting boost valve with the apply side of the intermediate servo and makes pressure available for coast boosting purposes. The pressure is not distributed to the coasting boost valve, however, if passage 292 is pressurized. It is pressurized only during operation in the D2 range or the D1 range. It is not pressurized when the manual valve is shifted to the L position.

Thus whenever the transmission is operating in either the D2 or D1 drive range the valve element 280 will assume the position shown, and it will not shift regardless of increases in the governor pressure in passage 248. Thus passage 278 and passage 166 will be in continuous communication. If the manual valve element 182 is shifted to the L position, however, the lower end of land 284 becomes exhausted and the only force that opposes the force of the governor pressure signal on land 282 is the force of the spring 286. The spring is insufficient to maintain the valve element 280 in the position shown when the manual valve is shifted to the L position and when the vehicle speed is high. Thus the valve element 280 will shift downwardly thereby establishing communication between passage 290 and passage 166. Passage 278 becomes blocked by land 282 thereby preventing transfer of throttle pressure to passage 166. Instead, control pressure from the apply side of the servo is made available to passage 166. This pressure acts upon the differential area of lands 158 and 160 of the pressure booster valve thereby causing an increase in the level at which the main regulator valve is caused to regulate.

Having thus described a preferred embodiment of our invention, what we claim and desire to secure by U.S. Letters Patent is:

1. In a control system for a multiple speed ratio power transmission mechanism adapted to deliver driving torque from a driving member to a driven member, fluid pressure operated brake means and fluid pressure operated clutch means for controlling the relative motion of torque delivery elements of said mechanism to establish multiple underdrive speed ratios, said clutch means and said brake means including a fluid pressure operated clutch servo and a fluid pressure operated brake servo, respectively, for actuating the same, a fluid pressure source, conduit structure interconnecting said source and said servos, a main regulator valve means communicating with said conduit structure for maintaining a controlled pressure level therein, fluid pressure distributor valve means situated in and partly defining said conduit structure for selectively distributing pressure from said source to said servos, a manual control valve means in said conduit structure between said source and said distributor valve means for distributing pressure to said distributor valve means whereby said mechanism is adapted to assume either a single ratio low speed condition or a multiple ratio forward drive range condition, a shiftable coasting boost valve means in fluid communication with said brake servo which when applied conditions the mechanism for intermediate speed ratio operation, and a fluid connection between said manual valve means and said coasting boost valve means whereby the latter receives a manual valve means position indicating pressure signal from the former, said coasting boost valve means being in fluid communication also with said main regulator valve means, means responsive to the speed of said driven member for moving said coasting boost valve means toward a position which will cause the latter to distribute brake servo pressure to said main regulator valve means whereby said main regulator valve means increases the regulated pressure level in said conduit structure when said manual control valve means is shifted to the lowest underdrive speed ratio and said brake servo is applied.

2. In a control system for an automatic power transmission mechanism having torque delivery gear elements capable of establishing a direct drive speed ratio and at least two forward driving underdrive speed ratios, friction torque establishing devices for controlling the relative motion of gear elements of said mechanism to condition the same for operation in either one or the other of said speed ratios, separate servo means for applying selectively said friction torque establishing devices including a brake servo with apply and release working pressure chambers which when applied provides intermediate speed ratio torque reaction, said brake servo being released when both servos are pressurized, a fluid pressure source, conduit structure in the connecting said pressure source and said servo means, fluid pressure distributor valve means disposed in and partly defining said conduit structure for controlling distribution of pressure from said source to said servo means, manual control valve means communicating with said conduit structure and situated in a fluid flow path intermediate said pressure source and said distributor valve means whereby the pressure distribution pattern in said distributor valve means can be altered upon manual adjustment of said manual control valve, said manual control valve means having a low speed ratio operating position and a forward drive range position, said manual valve means exhausting therethrough the release pressure chamber of said brake servo when it assumes said low speed ratio operating position, a pressure regulator valve means communicating with said source for maintaining a control pressure level in said conduit structure, coasting boost valve means in fluid communication with said regulator valve means and with the servo for the intermediate underdrive speed ratio, a branch passage interconnecting said manual control valve means and said coasting boost valve means for distributing a manual control valve means position indicating control pressure signal to the latter, means responsive to the speed of said torque delivery gear elements for moving said coasting boost valve means toward a position which will cause the latter to distribute an intermediate speed ratio brake servo pressure to said pressure regulator valve means whereby control pressure may be applied selectively to said regulator valve means to increase the regulated pressure level maintained in said conduit structure when said manual valve means is moved to the low speed ratio position and said intermediate speed ratio brake servo is applied.

3. In a control system for a multiple speed ratio power transmission mechanism adapted to deliver driving torque from a driving member to a driven member, fluid pressure operated brake means and fluid pressure operated clutch means for controlling the relative motion of torque delivery elements of said mechanism to establish multiple underdrive speed ratios, said clutch means and said brake means including a fluid pressure operated clutch servo and a fluid pressure operated brake servo, respectively, for actuating the same, a fluid pressure source, conduit structure interconnecting said source and said servos, a main regulator valve means communicating with said conduit structure for maintaining a controlled pressure level therein, fluid pressure distributor valve means situated in and partly defining said conduit structure for selectively distributing pressure from said source to said servos, a manual control valve means in said conduit structure between said source and said distributor valve means for distributing pressure to said distributor valve means whereby said mechanism is adapted to assume either a single ratio low speed condition or a multiple ratio forward drive range condition, a shiftable costing boost valve means in fluid communication with said brake servo which when applied conditions the mechanism for intermediate speed ratio operation, and a fluid connection between said manual valve means and said coasting boost valve means whereby the latter receives a manual valve means position indicating pressure signal from the former, said coasting boost valve means being in fluid communication also with said main regulator valve means, means responsive to the speed of said driven member for moving said coasting boost valve means toward a position which will cause the latter to distribute brake servo pressure to said main regulator valve means whereby said main regulator valve means is effective to increase the regulated pressure level in said conduit structure when said manual control valve means is shifted to the lowest underdrive speed ratio and said brake servo is applied, a source of a vehicle speed signal pressure, means for connecting said coasting boost valve means and said distributor valve means to said signal pressure source, said coasting boost valve means being sensitive to an increase in the magnitude of the pressure signal made available to it to establish an augmented regulated pressure level in said conduit structure whenever the manual control valve means is shifted to the lowest speed ratio position.

4. In a control system for an automatic power transmission mechanism having torque delivery gear elements capable of establishing a direct drive speed ratio and at least two forward driving underdrive speed ratios, friction torque establishing devices for controlling the relative motion of gear elements of said mechanism to condition the same for operation in either one or the other of said speed ratios, separate servo means for applying selectively said friction torque establishing devices including a brake servo with apply and release working pressure chambers which when applied provides intermediate speed ratio torque reaction, said brake servo being released when both servo chambers are pressurized, a fluid pressure source, conduit structure interconnecting said pressure source and said servo means, fluid pressure distributor valve means disposed in and partly defining said conduit structure for controlling distribution of pressure from said source to said servo means, manual control valve means communicating with said conduit structure and situated in a fluid flow path intermediate said pressure source and said distributor valve means whereby the pressure distribution pattern in said distributor valve means can be altered upon manual adjustment of said manual control valve, said manual control means having a low speed ratio operating position and a forward drive range position, said manual valve means exhausting therethrough the release pressure chamber of said brake servo when it assumes the low speed ratio operating position, a pressure regulator valve means communicating with said source for maintaining a control pressure level in said conduit structure, coasting boost valve means in fluid communication with said regulator valve means and with the servo for the intermediate underdrive speed ratio, a branch passage interconnecting said manual control valve means and said coasting boost valve means for distributing a manual control valve means position indicating control pressure signal to the latter, means responsive to the speed of said torque delivery gear elements for moving said coasting boost valve means toward a position which will cause the latter to distribute pressure from said servo means to said pressure regulator valve means whereby said pressure regulator valve means is effective to increase the regulated pressure level, maintained in said conduit structure when said manual valve means is moved to the low speed ratio position and said intermediate speed ratio brake servo is applied, a source of a vehicle speed signal pressure, means for connecting said coasting boost valve means and said distributor valve means to said signal pressure source, said coasting boost valve means being sensitive to an increase in the magnitude of the pressure signal made available to it to establish an augmented regulated pressure level in said conduit structure whenever the manual control valve element is shifted to the low speed ratio position.

5. In a control system for a multiple speed ratio power transmission mechanism adapted to deliver driving torque from a driving member to a driven member, fluid pressure operated brake means and fluid pressure operated clutch means for controlling the relative motion of torque delivery elements of said mechanism, said clutch means and said brake means including a fluid pressure operated clutch servo and a fluid pressure operated brake servo, respectively, for actuating the same, a fluid pressure source, conduit structure interconnecting said source and said servos, a main regulator valve means communicating with said conduit structure for maintaining a controlled pressure level therein, fluid pressure distributor valve means situated in and partly defining said conduit structure for selectively distributing pressure from said source to said servos, a manual control valve means in said conduit structure between said source and said distributor valve means for distributing pressure to said distributor valve means for distributing pressure to said distributor valve means to assume either a single ratio low speed condition or a multiple ratio forward drive range condition, a coasting boost valve means in fluid communication with said brake servo which when applied conditions the mechanism for intermediate speed ratio operation, and a fluid connection between said manual valve means and said coasting boost valve means whereby the latter receives a pressure signal from the former, said coasting boost valve means being in fluid communication also with said main regulator valve means, whereby said coasting boost valve is effective to distribute an auxiliary pressure to said main regulator valve means to increase the regulated pressure level in said conduit structure when said manual control valve is shifted to a position corresponding to said low speed condition, a source of a vehicle speed signal pressure, means for connecting said coasting boost valve means and said distributor valve means to said signal pressure source, said coasting boost valve means being sensitive to an increase in the magnitude of the pressure signal made available to it to establish an augmented regulated pressure level in said conduit structure whenever the manual control valve means is shifted to the low speed ratio position, a source of a pressure signal that is proportional in magnitude to engine torque, said coasting boost valve being in fluid communication with each of said signal sources, said coasting boost valve responding to an increase in the magnitude of said speed signal to establish communication between said servo and said regulator valve and an augmented control pressure level in said conduit structure and responding to a decrease in the vehicle speed signal to establish communication between said torque signal source and said regulator valve means whereby the latter is sensitive to changes in engine torque during normal forward drive operation.

6. In a control system for an automatic power transmission mechanism having torque delivery gear elements capable of establishing at least two forward driving speed ratios, friction torque establishing devices for controlling the relative motion of gear elements of said mechanism to condition the same for operation in either one or the other of said speed ratios, separate servo means for applying selectively said friction torque establishing devices, a fluid pressure source, conduit structure interconnecting said pressure source and said servo means, fluid pressure distributor valve means disposed in and partly defining said conduit structure for controlling distribution of pressure from said source to said servo means, manual control valve means communicating with said conduit structure and situated in a fluid flow path intermediate said pressure source and said distributor valve means whereby the pressure distribution pattern in said distributor valve means can be altered upon manual adjustment of said manual control valve means, said manual control valve means having a low speed ratio operating position and a forward drive range position, a pressure regulator valve means communicating with said source for maintaining a control pressure level in said conduit structure, coasting boost valve means in fluid communication with said regulator valve means and with the servo for a higher speed ratio, a source of a vehicle speed pressure signal, a source of a pressure signal that is proportional in magnitude to engine torque, said coasting boost valve being in fluid communication with each of said signal sources, said coasting boost valve responding to an increase in the magnitude of said speed signal to establish communication between said servo and said regulator valve to establish an augmented control pressure lavel in said conduit structure and responding to a decrease in the vehicle speed signal to establish communication between said torque signal source and said regulator valve means whereby the latter is sensitive to changes in engine torque during normal forward drive operation.

References Cited

UNITED STATES PATENTS

| | | | |
|---|---|---|---|
| 2,875,643 | 3/1959 | Kelley | 74—645 |
| 2,903,910 | 10/1959 | Chrnegie | 74—645 |
| 2,931,251 | 4/1960 | Wayman | 74—754 |
| 2,932,990 | 4/1960 | Cartwright et al. | 74—763 |
| 3,000,233 | 10/1961 | Roche | 74—645 |
| 3,049,937 | 8/1962 | Lindsay | 74—472 |
| 3,083,589 | 4/1963 | Knowles et al. | 74—677 |
| 3,103,831 | 10/1963 | De Corte et al. | 74—677 |
| 3,108,493 | 10/1963 | Hause | 74—688 |

ROBERT M. WALKER, *Primary Examiner.*

DAVID J. WILLIAMOWSKY, DONLEY J. STOCKING, *Examiners.*

J. R. BENEFIEL, *Assistant Examiner.*